United States Patent
Chang et al.

[11] Patent Number: 5,875,241
[45] Date of Patent: Feb. 23, 1999

[54] COMMUNICATION SYSTEM FOR PROCESSING CALLER ID INFORMATION

[75] Inventors: Aileen Y. Chang, New York, N.Y.; Joseph Michael Fallon, South Amboy, N.J.; Ryan S. Wallach, New York, N.Y.

[73] Assignee: Lucent Technologies, Murray Hill, N.J.

[21] Appl. No.: 870,137

[22] Filed: Jun. 5, 1997

Related U.S. Application Data

[63] Continuation of Ser. No. 708,761, Sep. 5, 1996, abandoned, which is a continuation of Ser. No. 215,994, Mar. 22, 1994, abandoned.

[51] Int. Cl.$^6$ ............ H04M 1/57; H04M 15/06; H04M 3/42; H04M 3/00
[52] U.S. Cl. ............ 379/142; 379/127; 379/201; 379/246
[58] Field of Search .......... 379/127, 142, 379/201, 210, 211, 212, 245, 246, 247, 249

[56] References Cited

U.S. PATENT DOCUMENTS

| | | | |
|---|---|---|---|
| 3,725,596 | 4/1973 | Maxon | 379/127 |
| 3,902,021 | 8/1975 | Walker | 379/189 |
| 3,914,555 | 10/1975 | Comas | 379/127 |
| 3,943,298 | 3/1976 | Clark | 379/127 |
| 4,506,348 | 3/1985 | Bennett et al. | 379/166 X |
| 4,672,660 | 6/1987 | Curtin | 379/88.19 |
| 5,168,517 | 12/1992 | Waldman | 379/211 |
| 5,263,084 | 11/1993 | Chaput | 379/142 |
| 5,265,145 | 11/1993 | Lim | 379/88.2 |
| 5,267,307 | 11/1993 | Izumi | 379/210 |
| 5,289,528 | 2/1994 | Ueno | 379/211 |
| 5,347,574 | 9/1994 | Morganstein | 379/211 |
| 5,388,150 | 2/1995 | Schneyer | 379/142 |

FOREIGN PATENT DOCUMENTS 2260670  4/1993  United Kingdom.

*Primary Examiner*—Harry S. Hong

[57] ABSTRACT

An information processing system adapted for use in conjunction with a telephone communication system. The information processing system includes a caller identification signal receiver, a timed switching device, and a call forwarding device. When no incoming call is being received, the timed switching device is in a first, open state, such that a circuit between the telephone line and the call forwarding device is interrupted. Upon receipt of an incoming call on the telephone line, the timed switching device and the caller identification signal receiver are activated. The timed switching device enters a second, closed state after a finite amount of time has elapsed such as, for example, several seconds, thereby allowing sufficient time for the caller identification signal to arrive on the incoming telephone line. The caller identification signal receiver responds to the receipt of incoming caller identification information by immediately activating the timed switching device, placing the timed switching device into the second state. The call forwarding device, responsive to the caller identification signal receiver, connects the incoming telephone call to a selected telephone set.

8 Claims, 3 Drawing Sheets

| DATA MEMORY TABLE | |
|---|---|
| INCOMING LINE NUMBER | DELAY ? |
| 801 | YES |
| 802 | NO |
| 803 | YES |
| 804 | YES |
| 805 | NO |
| ⋮ | ⋮ |
|  |  |

COMMUNICATION SYSTEM FOR PROCESSING CALLER ID INFORMATION

This is a Continuation of application Ser. No. 08/708, 761, filed Sep. 5, 1996, now abandoned, which in turn is a Continuation of application Ser. No. 08/215,994 filed Mar. 22, 1994, now abandoned.

BACKGROUND OF THE INVENTION

1. Field of Invention

The invention relates to a telephone communication system and, more particularly, to providing caller identification information at a station set.

2. Description of Related Art

Presently existing telephone communication systems may include a plurality of station sets, such as an attendant station set and a plurality of adjunct station sets associated therewith. In these communication systems, an incoming call may be answered at the attendant station set for subsequent forwarding to one of the adjunct station sets. Since caller ID information is sent from the central switching office to the called telephone at a point in time no earlier than the ring interval between the first and second ring signals, this caller ID information is lost if the attendant station set answers an incoming call too soon.

Loss of caller ID information is an undesired consequence of currently existing communication system topologies. However, there is an increasing demand for telephone users to better serve their clients by using called party information. If possible, telephone users would like to screen calls prior to answering the phone. Furthermore, calling party information could be used in conjunction with various applications to provide specialized services to specific calling parties. What is needed is a communications topology which preserves caller ID information until the call is answered by the called party at an adjunct station set.

SUMMARY OF THE INVENTION

The aforementioned problems related to the loss of caller identification information are overcome by delaying an incoming ring signal for a time duration of sufficient length to allow for the receipt of any caller identification information.

BRIEF DESCRIPTION OF THE DRAWINGS

The characteristics and operation of the present invention will be more apparent from the following detailed description taken in conjunction with the drawings in which.

DETAILED DESCRIPTION OF PREFERRED EMBODIMENTS

Figure 1:
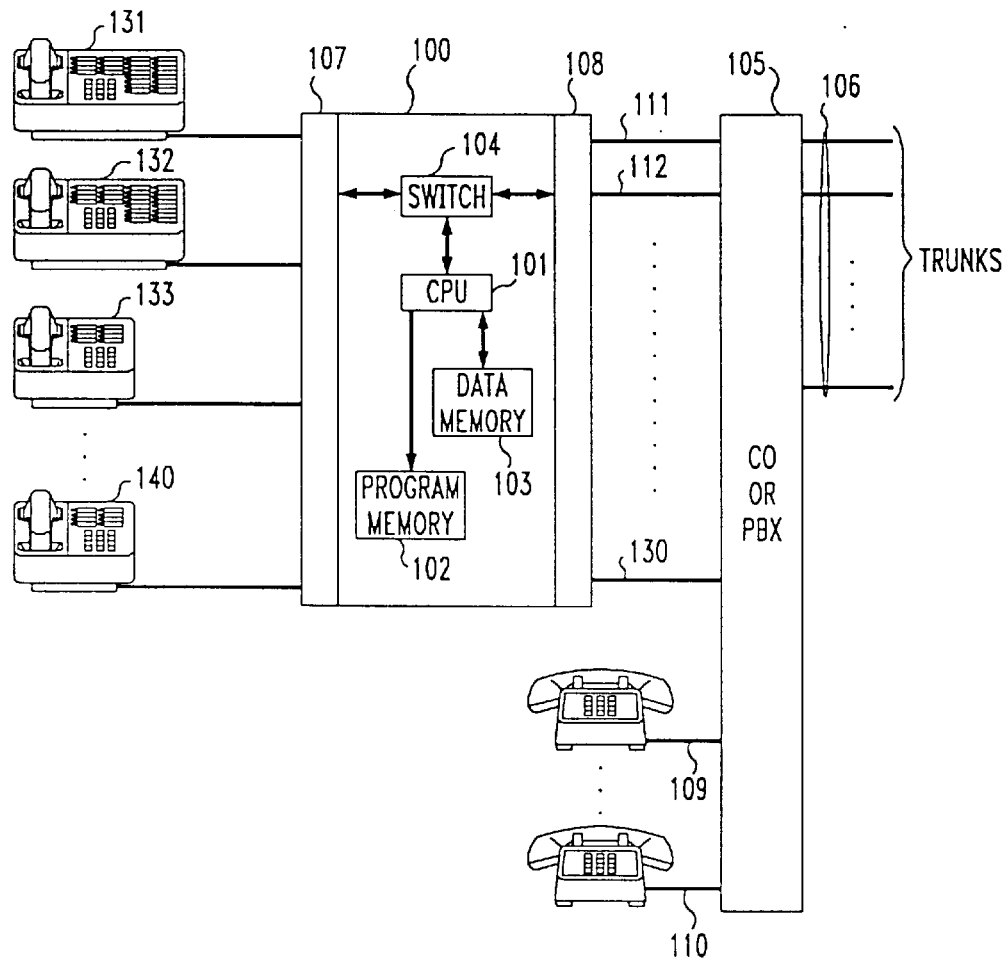
FIG. 1 is a block diagram of a telephone communication system useful for describing the present invention.

Shown in FIG. 1 is an illustrative block diagram of a communication system useful for describing the operation of the present invention. The system includes common control unit 100 which connects to one or more central office (CO) Centrex or PBX lines, such as 111–130, via interface 108, and which connects to two or more station sets, such as 131–140, via interface 107. A CO or PBX 105 includes trunks 106 and additional station sets 109, 110. Station sets 131, 132 may be attendant station sets which are equipped to forward incoming telephone calls to other station sets 133–140.

Control unit 100 establishes and controls all intercom and CO or PBX line communications. Control unit 100 includes switch 104, central processing unit (CPU) 101, program memory 102 and data memory 103. Program memory 102 provides instructions to CPU 101 for controlling switch 104 and interface units 107, 108 to enable the various operating features and functions of the system. Data memory 103 is utilized by CPU 101 for storing and accessing data associated with performing the various functions and features programmed in program memory 102. In one preferred embodiment, CPU 101 is a microprocessor, program memory 102 is a read-only memory (ROM), and data memory 103 is random-access memory (RAM).

Interface circuits 107, 108 may include well-known circuitry such as a ring detector circuit, a switching matrix, network control circuits, line circuits, and other circuitry required by the system to establish, maintain, and terminate communications. One communication system which may embody the present invention uses interchangeable program cartridges to supplement program memory 102 and data memory 103, and is described in U.S. Pat. No. 4,506,346, issued to Bennett et al. on Dec. 1, 1982. Another communication system which may embody the present invention uses a shared memory device in the form of random-access memory to supplement program memory 102 and data memory 103.

Figure 2:
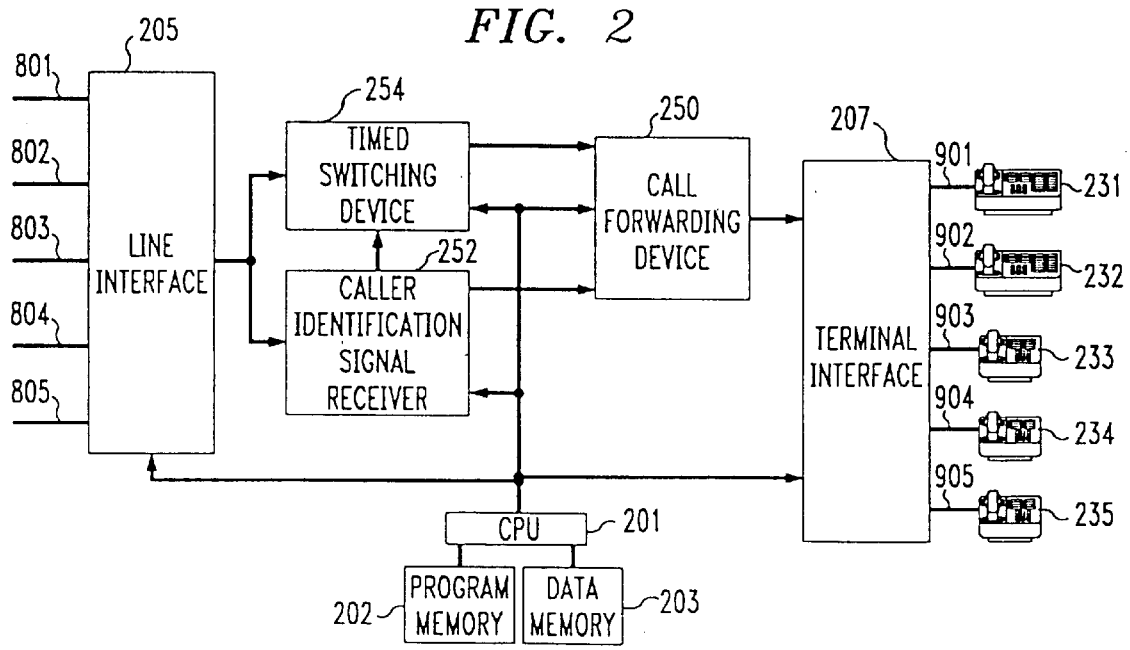
FIG. 2 is a block diagram of the information processing system of the present invention.

FIG. 2 is a block diagram of the information processing system of the present invention which is adapted for use in conjunction with a telephone communication system. The telephone communication system includes a plurality of station sets, such as attendant station set 231 for forwarding incoming telephone calls, and a plurality of adjunct station sets 232–235 each adapted for receiving incoming telephone calls. The attendant station set 231 and the adjunct station sets 232–235 are connected to terminal interface 207, via station set lines 901, 902, 903, 904, 905. Terminal interface 207 interfaces call forwarding device 250 with station set lines 901–905, as well as with any station sets 231–235 connected to station set lines 901–905. Terminal interface 207 may perform the function of coupling together two or more adjunct station sets 232–235, and/or coupling together the attendant station set 231 and one or more adjunct station sets 232–235. The information processing system of FIG. 2 operates in conjunction with at least one telephone line adapted for carrying incoming telephone calls, such as, for example, telephone lines 801, 802, 803, 804, and 805. Line interface 205 interfaces the telephone lines 801, 802, 803, 804, and 805 with a timed switching device 254 and a caller identification signal receiver 252.

Timed switching device 254, call forwarding device 250, line interface 205, terminal interface 207, and caller identification signal receiver 252 operate under the control of central processing unit (CPU) 201. CPU 201 is equipped with program memory 202 and data memory 203. Program memory 202 provides instructions to CPU 201 for controlling timed switching device 254, call forwarding device 250, caller identification signal receiver 252, terminal interface 207, and line interface 205 to enable the various operating features and functions of the system. Data memory 203 is utilized by CPU 201 for storing and accessing data associated with performing the various functions and features programmed in program memory 202.

In one preferred embodiment, CPU 201 is a microprocessor, program memory 202 is a read-only memory (ROM), and data memory 203 is random-access memory (RAM). Line interface 205 and terminal interface 207 may each include well-known circuitry such as a ring detector circuit, a switching matrix, network control circuits, line circuits, and other circuitry required by the system to establish, maintain, and terminate communications. One communication system which may embody the present invention uses interchangeable program cartridges to supplement program memory 202 and data memory 203, and is described in U.S. Pat. No. 4,506,346, noted above. Another communication system which may embody the present invention uses a shared memory device in the form of random-access memory to supplement program memory 202 and data memory 203.

Timed switching device 254 and call forwarding device 250 are electronic switching devices of a type known to those skilled in the art. For example, timed switching device 254 and call forwarding device 250 may be implemented using the switch 104 and the CPU 101 of FIG. 1, along with the appropriate control software for CPU 101. The selection and acquisition of suitable control software are matters well-known to those skilled in the art. Caller identification signal receiver 252 is any receiver responsive to conventional caller identification signals (ICLID signals) on a conventional telephone line. The design of such caller identification signal receivers is well-known to those skilled in the art.

The timed switching device 254 is coupled to the line interface 205, the caller identification signal receiver 252, and the call forwarding device 250. Call forwarding device 250 is coupled to terminal interface 207 which, in turn, is connected to a plurality of station set lines 901, 902, 903, 904, 905, each adapted for connection to one or more stations sets 231–235. The caller identification signal receiver 252 is coupled to call forwarding device 250, and also to incoming telephone lines 801–805 via line interface 205.

When no incoming call is being received, the timed switching device is in a first, open state, such that a circuit between the telephone line and the call forwarding device is interrupted. Upon receipt of an incoming telephone call on any of the incoming telephone lines 801–805, line interface 205 sets a timer within timed switching device to a time t=Td, and caller identification signal receiver 252 is activated. During a time interval equal to Td, the caller identification signal receiver 252 awaits the receipt of a caller identification signal (ICLID signal) from an incoming telephone line 801–805 via line interface 205. Upon receipt of an ICLID signal, timed switching device 254 activates call forwarding device 250. If an ICLID signal is not received within time period Td, then the call forwarding device 250 is activated at the expiration of time period Td. When activated, call forwarding device 250 forwards the incoming telephone call to one or more station set lines 901–905, and/or one or more station sets 231–235.

The incoming telephone call may be routed to a given station set 231–235 and/or station set line 901–905 based upon information contained in the ICLID signal if desired, but such routing is not required, and random or arbitrary routing procedures could be employed. In this manner, in the case where an ICLID signal is received, the caller identification information is received at one of the station sets 231–235 to which the call is forwarded, irrespective of the specific call routing procedure used. If the timed switching device 254 with time delay Td was not incorporated into the system, an incoming telephone call would be immediately forwarded to one of the station sets 231–235, with the undesired result that caller identification information is lost if the call recipient goes off-hook too soon.

Upon receipt of an incoming call on the telephone line, the timed switching device 254 and the caller identification signal receiver 252 are activated. The timed switching device 254 enters a second, closed state after a finite time interval Td. The interval Td should be selected to allow sufficient time for the caller identification (ICLID) signal to arrive on the incoming telephone line. A sufficient time period may be several seconds as, for example, a Td of 6 seconds. Note that, at any given time, the timed switching device 254 is in one of two possible states. In a first, open state, the timed switching device 254 does not signal the presence of an incoming telephone call to call forwarding device 250. The timed switching device 254 remains in the open state after receipt of an incoming telephone call and until any of two events occur. The first such event is the receipt of an ICLID signal, and the second such event is the passage of a time interval equal to Td. The caller identification signal receiver 252 responds to the receipt of an incoming ICLID signal by immediately activating the timed switching device 254, placing the timed switching device into a second, closed state. Alternatively, the timed switching device 254 may remain in the open state after receipt of an incoming call, until the passage of a time interval equal to Td, irrespective of whether or not any caller identification information is received. In this alternative scheme, after Td expires, the timed switching device 254 is placed into the closed state. In the closed state, the timed switching device 254 switches the incoming telephone call to the call forwarding device 250 which, in turn, connects the call to a selected one of the plurality of station sets 231–235 via terminal interface 207.

Figures 3, 4:
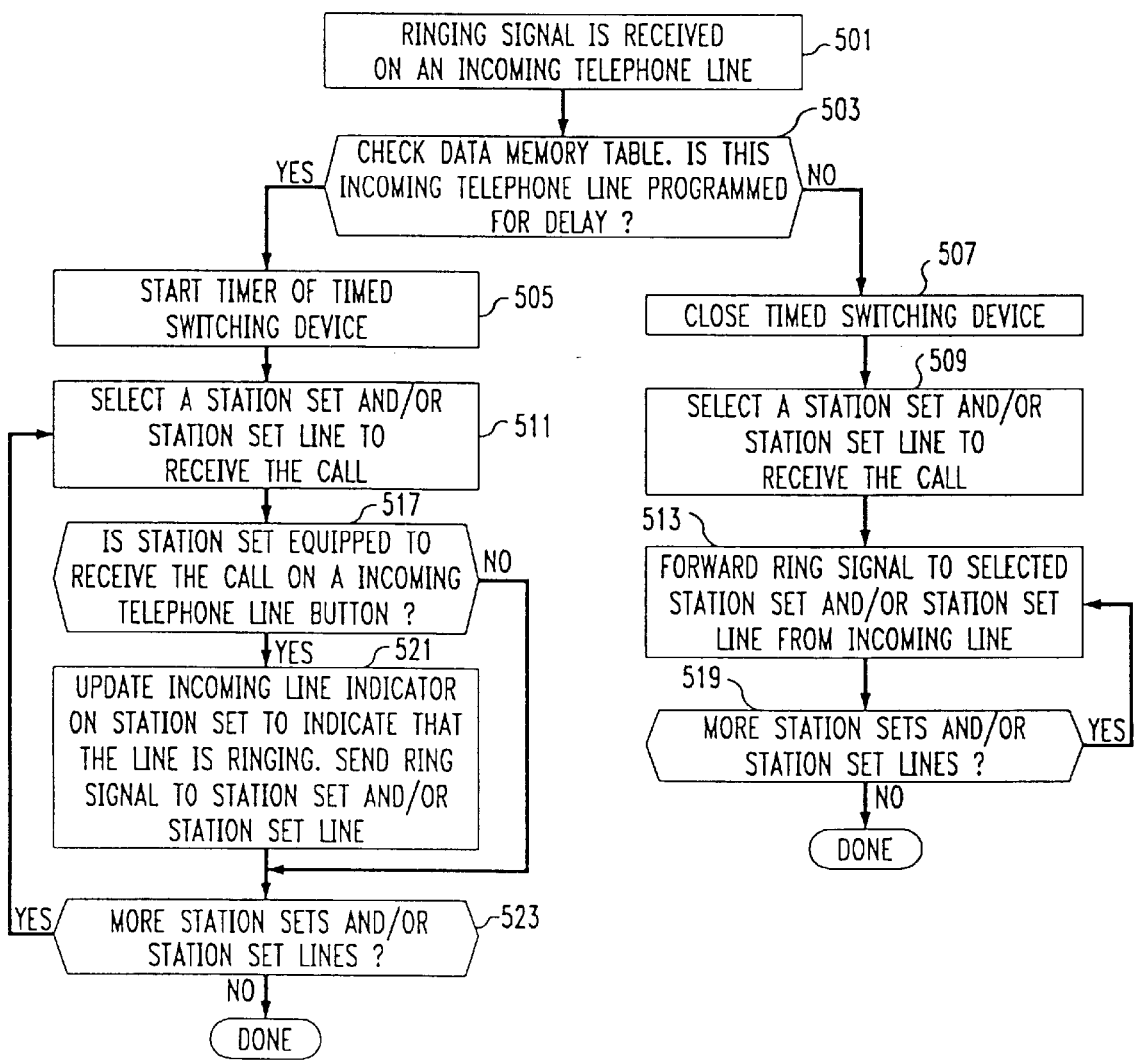
FIG. 3 is a diagram illustrating data structures utilized by tie data memory shown in FIGS. 1 and 2.
FIG. 4 is a software flowchart showing a first sequence of operations implemented by the CPU shown in FIGS. 1 and 2.

FIG. 3 is a diagram illustrating data structures utilized by the data memory shown in FIGS. 1 and 2. Data memory 203 (FIG. 2) contains a data memory table which associates incoming telephone lines 801–805 with corresponding time delay specifications. Each time delay specification merely specifies whether or not a time delay of Td is to be applied to incoming telephone calls arriving on a given incoming telephone line 801–805. If the specification is "YES", a time delay of Td is applied to the telephone line corresponding to this specification, as described above in connection with FIG. 2. On the other hand, if the specification is "NO", a time delay is not applied to incoming telephone calls on that telephone line 801–805, and the call is immediately directed to one of the station sets 231–235.

In the system of FIG. 2, timed switching device 254 provides a time delay Td on a specific incoming telephone line 801–805 starting at a point in time independent of the starting times of other time delays Td which are applied to other incoming telephone lines. For example, if a first incoming ring signal is received on line 801 at time T1 and a second ring signal is received on line 802 at time T2, a time delay of Td will be applied to line 801, starting at time T1, and a time delay of Td will also be applied to line 802, starting at time T2. Consequently, timed switching device 254 is equipped to implement a plurality of time delays Td, each time delay Td starting at a time independent of other time delays Td.

Figure 5:
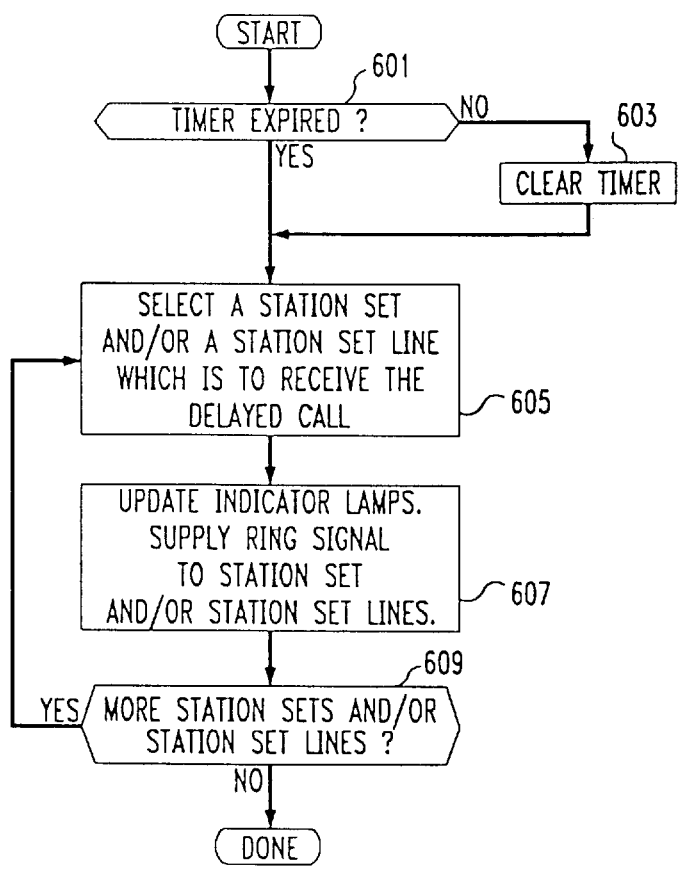
FIG. 5 is a software flowchart showing a second sequence of operations implemented by the CPU shown in FIGS. 1 and 2.

FIG. 4 is a software flowchart showing a first sequence of operations implemented by the CPU 101 and 201 shown in FIGS. 1 and 2, respectively. This operational sequence is executed when line interface 205 (FIG. 2) detects a ring signal on an incoming telephone line 801–805. The routine commences at block 501, where a ringing signal is received on an incoming telephone line. At block 503, the contents of the data memory table (FIG. 3) is checked to ascertain whether or not this incoming telephone line is programmed for time delay. If not, program control transfers to block 507, where timed switching device 254 (FIG. 2) is placed into the closed state. Next, a station set 231–235 and/or station set line 901–905 (FIG. 2) is selected to receive the incoming telephone call (FIG. 5, block 509). A ring signal is forwarded to the selected station set and/or station set line from the incoming telephone line at block 513. Block 519 performs a test to see whether additional station sets and/or station set lines exist for receiving the incoming telephone call. If not, the program is done. If so, the program loops back to block 513, where the call is connected to the additional station set and/or station set line.

The affirmative branch from block 503 leads to block 505, where the timer of timed switching device 254 (FIG. 2) is started. Next (FIG. 5, block 511), a station set and/or a station set line is selected to receive the call. The selection may be performed by any of a number of algorithms executed by CPU 201 and which are known to those skilled in the art. At block 517, a test is performed to ascertain whether or not the selected station set and/or the station set connected to the selected station set line is equipped to receive the call on a station set line button. For example, station sets typically include a plurality of station set line buttons. Each button corresponds to a given incoming telephone line 801–805, and is provided for the purpose of selecting a given incoming telephone line from a plurality of incoming telephone lines switchable to a given station set. Station sets also typically include indicator lamps corresponding to each incoming telephone line. In addition to line buttons, station sets may be equipped with optional terminal interface buttons which may be used, for example, to communicate with other station sets through terminal interface 207.

The aforementioned indicator lamps may be employed to show the status of a given station set line. The status of a line refers to whether the line is currently occupied, ringing with an incoming telephone call, or unused. Indicator lamps may be, for example, light-emitting diodes (LEDs), such that two LEDs, a green LED and a red LED, are allocated to each incoming telephone line. Illumination of the red LED may signify that, upon the occurrence of an off-hook condition, a corresponding incoming telephone line is selected. Blinking of the green LED may indicate that an incoming line is currently ringing, and no illumination of the green LED may indicate that the line is vacant.

If the station set is equipped to receive the call, program control progresses to block 521, where the indicator lamp on the station set is updated to indicate that the line is ringing. The ring signal is forwarded from the incoming line to the station set and/or station set line. This is accomplished, for example, using the timed switching device 254 and call forwarding device 250 (FIG. 2). Program control then transfers to block 523. Note that the negative branch from block 517 leads directly to block 523, effectively skipping over block 521.

At block 523, a test is performed to see whether or not there are additional station sets and/or station set lines. If not, the program is done. If so, the program loops back to block 511 where the shared memory table is checked for the new station set and/or station set line.

FIG. 5 is a software flowchart showing a second sequence of operations implemented by the CPU 101, 201, respectively, shown in FIGS. 1 and 2. The program commences at block 601, where a test is performed to determine whether or not the timer of timed switching device 254 (FIG. 2) has expired. If the timer has not expired, it is cleared at block 603, and program control advances to block 605. If the timer has expired, program control progresses directly to block 605. At block 605, a station set and/or a station set line is selected which is to receive an incoming call delayed by the timed switching device 254 (FIG. 2). The indicator lamps (i.e., LEDs) and/or other type of station set display are updated at block 607, and a ring signal is supplied to the station set and/or station set line.

Program control progresses to block 609, where a test is performed to see whether or not there are more station sets and/or station set lines. If so, program control loops back to block 605. If not, the program is done.

It is to be understood that the above-described embodiments are merely illustrative principles of the invention and that many variations may be devised by those skilled in the art without departing from the scope of the invention. It is therefore intended that such variations be included within the scope of the following claims.

What is claimed is:

1. An information processing system including:

(i) an incoming telephone line, (ii) a plurality of station sets, and (iii) a private branch exchange (PBX) switch for coupling the plurality of station sets to the incoming telephone line;

the PBX switch comprises:

(a) a receiving device for receiving a caller identification signal from the incoming telephone line;

(b) a timed switching device having a first state and a second state, wherein the timed switching device is in the first state prior to the receipt of an incoming telephone call on the incoming telephone line and, is responsive to one of (i) the expiration of time period Td which starts upon the receipt of the incoming telephone call; and (ii) the receipt of a caller identification signal by the receiving device to enter a second state; and (c) a call forwarding device responsive to the timed switching device entering the second state to forward the incoming telephone call to any of the plurality of station sets.

2. An information processing system including:

(i) an incoming telephone line;

(ii) a plurality of station sets; and (iii) a private branch exchange (PBX) switch for coupling the plurality of station sets to the incoming telephone line;

the PBX switch comprises:

(a) a receiving device for receiving a caller identification signal from the incoming telephone line;

(b) a timed switching device having a first state and a second state, wherein the switching device is in the first state prior to the receipt of an incoming telephone call on the incoming telephone line and is responsive to the expiration of a time period Td which starts upon the receipt of the incoming telephone call to enter the second state; and (c) a call forwarding device responsive to the timed switching device entering the second state to forward the incoming telephone call to any of the plurality of station sets.

3. A method for processing of information for use in a communications system including at least one telephone line, a plurality of station sets adapted to receive incoming telephone calls, and a private branch exchange (PBX) switch adapted to couple the at least one telephone line to the plurality of station sets, the PBX comprising:

(a) a receiving device for receiving a caller identification signal from an incoming telephone line, (b) a timed switching device having a first state and a second state, and (c) a call forwarding means device responsive to the timed switching device entering the second state to forward an incoming telephone call to any of a plurality of station sets, the method comprising the following steps:

(a) the PBX switch placing the timed switching device into the first state, such that, in the absence of an incoming telephone call, a circuit between the telephone line and the call forwarding device is open-circuited;

(b) upon receipt of an incoming call on the telephone line, the PBX switch activating the timed switching device and the receiving device;

(c) the PBX placing the timed switching device into the second state after a finite amount of time has elapsed after receipt of an incoming call, such that a circuit between the telephone line and the call forwarding device is completed, thereby allowing sufficient time for a caller identification signal to arrive on the incoming telephone line.

4. A method for processing information as set forth in claim 3 further including the step of the receiving device responding to the receipt of incoming caller identification information by activating the timed switching device, and placing the timed switching device into the second state.

5. A method for processing information as set forth in claim 4 further including the step of the call forwarding device, in response to the receiving device connecting the incoming telephone call to a selected one of the plurality of station sets.

6. A method of processing information as set forth in claim 3 further including the step of the switching device responding to the receipt of an incoming telephone call such that the switching device is in the first state prior to the receipt of an incoming telephone call and, upon receipt of an incoming telephone call, entering the second state upon the occurrence of at least one of (i) the expiration of a time period Td which starts upon receipt of an incoming telephone call; and (ii) the receipt of a caller identification signal by the receiving device.

7. A method of processing information as set forth in claim 3 wherein time period Td is approximately from 4 to 8 seconds.

8. A method of processing information as set forth in claim 7 wherein the time period Td is approximately 6 seconds.

* * * * *